(12) United States Patent  
Matsuo et al.

(10) Patent No.: US 12,283,094 B2  
(45) Date of Patent: Apr. 22, 2025

(54) SENSOR AIMING DEVICE, DRIVING CONTROL SYSTEM, AND CORRECTION AMOUNT ESTIMATION METHOD

(71) Applicant: Hitachi Astemo, Ltd., Hitachinaka (JP)

(72) Inventors: Shunsuke Matsuo, Hitachinaka (JP); Tatsuhiko Monji, Hitachinaka (JP); Akira Kuriyama, Hitachinaka (JP); Haruki Nishimura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 308 days.

(21) Appl. No.: 17/790,008

(22) PCT Filed: Dec. 8, 2020

(86) PCT No.: PCT/JP2020/045574  
§ 371 (c)(1),  
(2) Date: Jun. 29, 2022

(87) PCT Pub. No.: WO2021/140811  
PCT Pub. Date: Jul. 15, 2021

(65) Prior Publication Data  
US 2023/0044311 A1 Feb. 9, 2023

(30) Foreign Application Priority Data  
Jan. 10, 2020 (JP) .................................. 2020-002880

(51) Int. Cl.  
*G06V 10/80* (2022.01)  
*B60W 50/02* (2012.01)  
(Continued)

(52) U.S. Cl.  
CPC ....... *G06V 10/803* (2022.01); *B60W 50/0205* (2013.01); *G01S 7/4972* (2013.01);  
(Continued)

(58) Field of Classification Search  
CPC .... G06V 10/803; G06V 20/58; G06V 20/588; G06V 2201/07; B60W 50/0205; B60W 2050/0215; B60W 2556/35; G01S 7/4972  
See application file for complete search history.

(56) References Cited

U.S. PATENT DOCUMENTS

2003/0034913 A1* 2/2003 Asanuma .............. G01S 7/4056  
342/72  
2005/0219530 A1 10/2005 Horibe et al.  
(Continued)

FOREIGN PATENT DOCUMENTS

JP 2003-57334 A 2/2003  
JP 2004-317507 A 11/2004  
(Continued)

OTHER PUBLICATIONS

International Search Report and Written Opinion for Application No. PCT/JP2020/045574, mailed Mar. 16, 2021. (12 pages).

*Primary Examiner* — Dale W Hilgendorf  
(74) *Attorney, Agent, or Firm* — Volpe Koenig

(57) ABSTRACT

A sensor aiming device includes: a target positional relationship processing unit for outputting positional relationship information of first and second targets; a sensor observation information processing unit configured to convert the observation result of the first and second targets into a predetermined unified coordinate system according to a coordinate conversion parameter, perform time synchronization at a predetermined timing, and extract first target information indicating a position of the first target and second target information indicating a position of the second target; a position estimation unit configured to estimate a position of the second target using the first target information, the second target information, and the positional relationship information; and a sensor correction amount estimation unit configured to calculate a deviation amount of the second sensor using the second target information and an estimated position of the second target and estimate a correction amount.

7 Claims, 10 Drawing Sheets

(51) Int. Cl.
G01S 7/497 (2006.01)
G06V 20/56 (2022.01)
G06V 20/58 (2022.01)

(52) U.S. Cl.
CPC ............ G06V 20/58 (2022.01); G06V 20/588 (2022.01); *B60W 2050/0215* (2013.01); *B60W 2556/35* (2020.02); *G06V 2201/07* (2022.01)

(56) References Cited

U.S. PATENT DOCUMENTS

| | | | |
|---|---|---|---|
| 2017/0307730 A1 | 10/2017 | Baba | |
| 2017/0329000 A1* | 11/2017 | Masui | B60W 30/16 |
| 2019/0120955 A1* | 4/2019 | Zhong | G01S 13/931 |
| 2019/0279006 A1* | 9/2019 | Ozawa | G01S 13/931 |
| 2020/0226790 A1* | 7/2020 | Alvarez | G01S 13/865 |
| 2020/0284889 A1* | 9/2020 | Araki | G01B 11/272 |
| 2021/0033722 A1* | 2/2021 | Søndergaard | G01S 13/66 |
| 2021/0190958 A1* | 6/2021 | Nonaka | G01S 7/4817 |
| 2022/0099445 A1* | 3/2022 | Nakata | G06V 20/58 |
| 2022/0289245 A1* | 9/2022 | Kuriyama | B60W 60/00186 |
| 2023/0044311 A1* | 2/2023 | Matsuo | G01S 13/931 |

FOREIGN PATENT DOCUMENTS

| | | |
|---|---|---|
| JP | 2016-065759 A | 4/2016 |
| JP | 2016-103225 A | 6/2016 |
| JP | 2019-152617 A | 9/2019 |
| JP | 2020-143969 A | 9/2020 |
| KR | 10-2020-0057341 A | 5/2020 |

* cited by examiner

SENSOR INFORMATION BEFORE TARGET DETERMINATION

AFTER TARGET DETERMINATION

AFTER OFFSET ERASURE

SENSOR INFORMATION
BEFORE TARGET DETERMINATION

AFTER TARGET DETERMINATION

AFTER OFFSET ERASURE

SENSOR INFORMATION
BEFORE TARGET DETERMINATION

AFTER TARGET DETERMINATION

AFTER OFFSET ERASURE

SENSOR AIMING DEVICE, DRIVING CONTROL SYSTEM, AND CORRECTION AMOUNT ESTIMATION METHOD

TECHNICAL FIELD

The present invention relates to an in-vehicle control device, and more particularly to a sensor aiming device that corrects sensor data.

BACKGROUND ART

Driving assistance systems and automatic driving systems have been developed to achieve various purposes such as reduction of traffic accidents, reduction of driver's burden, improvement of fuel efficiency for reducing global environmental burden, and provision of transportation means to vulnerable road users for realizing a sustainable society. In the driving assistance system and the automatic driving system, a plurality of vehicle periphery monitoring sensors are provided to monitor the periphery of the vehicle instead of the driver. Further, in order to guarantee the safety of these systems, a function of performing correction even when the mounting angle of the vehicle periphery monitoring sensor is deviated is required.

Background art of the present technical field includes the following prior art. PTL 1 (JP 2016-065759 A) describes an axis deviation amount estimation device that determines whether a first object detected by an electromagnetic wave sensor that detects a position of an object by transmitting and receiving an electromagnetic wave and a second object detected by an image sensor that detects a position of an object by performing image processing on a captured image are the same object in a collision reduction device, and calculates, as an axis deviation amount, an angle between a first line segment connecting a position of the own vehicle and the first object and a second line segment connecting the position of the own vehicle and the second object when it is determined that the first object and the second object are the same object (see Abstract).

In addition, in PTL 2 (JP 2004-317507 A), the waveform of the reception intensity with respect to the position in the scanning direction becomes an inverted W shape, and the axis deviation including the roll direction of the radar is adjusted using the adjustment target in which the brightness/darkness pattern and the outer shape of the detection surface are set such that the axis deviation amount can be quantitatively calculated for each direction from the waveform. In addition, in the fusion method, an axis adjustment method is described in which an image of the same adjustment target is captured after axis adjustment of the radar, and axis adjustment of the camera with respect to the radar is performed on the basis of coordinate values of a plurality of feature points in the image on an image plane (see Abstract).

CITATION LIST

Patent Literature

PTL 1: JP 2016-065759 A
PTL 2: JP 2004-317507 A

SUMMARY OF INVENTION

Technical Problem

However, in PTL 1, it is determined whether an object detected by a radio wave sensor and an object detected by an image sensor are the same object, and when it is determined that the objects are the same, an axis deviation amount is calculated. However, when the detected objects are not the same object, the axis deviation amount is not calculated. In addition, there is a problem that variations in detection points and differences in detection points among a plurality of sensors occur regardless of the magnitude of the lateral width of the detected object. In addition, in PTL 2, after the axis deviation adjustment using the detection information of the target is performed by a single radar, the axis deviation adjustment using the imaging of the target by the camera is performed, but there is a problem that it is necessary to physically correct the axis deviation of the sensor using human work or an axis adjustment device in the end.

Solution to Problem

A representative example of the invention disclosed in the application is as follows. That is, there is provided a sensor aiming device to which an observation result of a first target by a first sensor and an observation result of a second target by a second sensor are input, the sensor aiming device including: a target positional relationship processing unit configured to output positional relationship information of the first target and the second target; a sensor observation information processing unit configured to convert the observation result of the first target and the observation result of the second target into a predetermined unified coordinate system according to a coordinate conversion parameter, perform time synchronization at a predetermined timing, and extract first target information indicating a position of the first target and second target information indicating a position of the second target; a position estimation unit configured to estimate a position of the second target using the first target information, the second target information, and the positional relationship information; and a sensor correction amount estimation unit configured to calculate a deviation amount of the second sensor using the second target information and an estimated position of the second target and estimate a correction amount. The coordinate conversion parameter is changed based on the correction amount.

Advantageous Effects of Invention

According to the present invention, an axis deviation of a sensor can be corrected. Objects, configurations, and effects besides the above description will be apparent through the explanation on the following embodiments.

DESCRIPTION OF EMBODIMENTS

Figure 1:
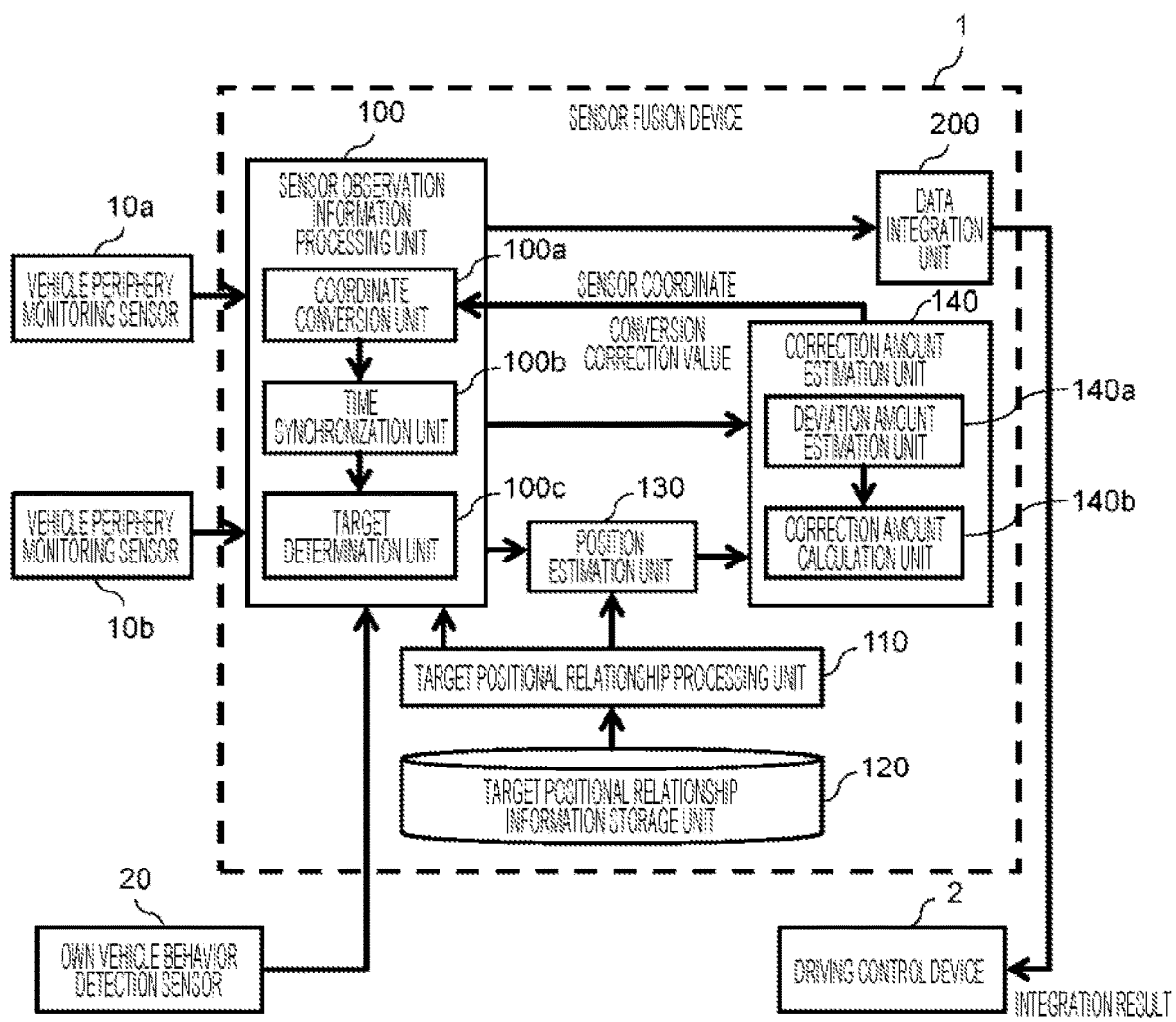
FIG. 1 is a functional block diagram of a sensor fusion device having a sensor aiming function according to a first embodiment.

Hereinafter, embodiments of the present invention will be described with reference to the drawings. Note that, in all the drawings for explaining modes for carrying out the invention, blocks or elements having the same function are denoted by the same reference numerals, and repeated description thereof will be omitted.

First Embodiment

FIG. 1 is a functional block diagram illustrating an embodiment of a sensor fusion device 1 having a sensor aiming function.

As illustrated in FIG. 1, the sensor fusion device 1 of the present embodiment includes a sensor observation information processing unit 100, a target positional relationship processing unit 110, a target positional relationship information storage unit 120, a position estimation unit 130, and a data integration unit 200. The sensor aiming function is configured by each unit other than the data integration unit 200 of the sensor fusion device 1, and the sensor aiming device is realized by each unit other than the data integration unit 200. In addition, output signals of a first vehicle periphery monitoring sensor 10a, a second vehicle periphery monitoring sensor 10b, and an own vehicle behavior detection sensor 20 are input to the sensor fusion device 1.

The first and second vehicle periphery monitoring sensors 10a and 10b are sensors that detect a road structure (object or road surface display object) around an own vehicle 800. As an example, the first and second vehicle periphery monitoring sensors 10a and 10b include a millimeter-wave radar, a camera (visible light, near-infrared, mid-infrared, or far-infrared camera), a light detection and ranging (LiDAR), a sonar, a time of flight (TOF) sensor, a sensor combining these, or the like.

The own vehicle behavior detection sensor 20 is a sensor group that detects a speed, a yaw rate, and a steering angle of the own vehicle 800. Examples thereof include a wheel speed sensor, a steering angle sensor, and the like.

The sensor fusion device 1 (electronic control device) and various sensors (the first vehicle periphery monitoring sensor 10a, the second vehicle periphery monitoring sensor 10b, and the like) of the present embodiment include a computer (microcomputer) including an arithmetic device, a memory, and an input/output device.

The arithmetic device includes a processor and executes a program stored in the memory. A part of the processing performed by the arithmetic device executing the program may be executed by another arithmetic device (for example, hardware such as a field programmable gate array (FPGA) and an application specific integrated circuit (ASIC)).

The memory includes a ROM and a RAM which are non-volatile storage elements. The ROM stores an invariable program (for example, BIOS) and the like. The RAM is a high-speed and volatile storage element such as a dynamic random access memory (DRAM) and a non-volatile storage element such as a static random access memory (SRAM), and stores a program executed by the arithmetic device and data used when the program is executed.

The input/output device is an interface that externally transmits processing contents by the electronic control device or the sensor and receives data from the outside according to a predetermined protocol.

The program executed by the arithmetic device is stored in a non-volatile memory which is a non-transitory storage medium of the electronic control device or the sensor.

The target positional relationship information storage unit 120 records position information of a stationary object (for example, a support column and a beam of a guardrail, a road sign, and road markings such as a white line, a soundproof wall, and a road stud (chatter bars, cat's eyes, botts dots, etc.)) to be a target in a process described below. For example, position information of a stationary object is held as map information. In addition to the position information of the stationary object to be a target, the target type is also recorded in association with the position information. Here, the target type is a classification of a target indicating what the object is, and an arrangement state of detection points (one detection point, a certain array pattern, or the like).

In FIGS. 2A to 4A, the own vehicle 800 travels at a speed of 0 or more in the direction of the own vehicle travel route (that is, the own vehicle 800 may be traveling or stopped). The first vehicle periphery monitoring sensor 10a and the second vehicle periphery monitoring sensor 10b are attached to the own vehicle 800. In addition, around the own vehicle 800, there are a first target 300 and a first non-target 390 observed by the first vehicle periphery monitoring sensor 10a, and a second target 400 and a second non-target 490 observed by the second vehicle periphery monitoring sensor 10b. Here, the first target 300 is a target that can be detected with high accuracy by the first vehicle periphery monitoring sensor 10a, and the second target 400 is a target that can be detected with high accuracy by the second vehicle periphery monitoring sensor 10b. Among the objects observed by the vehicle periphery monitoring sensors 10a and 10b, the targets 300 and 400 are stationary objects whose positions are recorded in the target positional relationship information storage unit 120, and the non-targets 390 and 490 are stationary objects or mobile objects whose positions are not recorded in the target positional relationship information storage unit 120.

Next, processing of the sensor fusion device 1 having the sensor aiming function according to an embodiment of the present invention will be described with reference to FIGS. 1 to 4A to 4D.

Figure 2A:
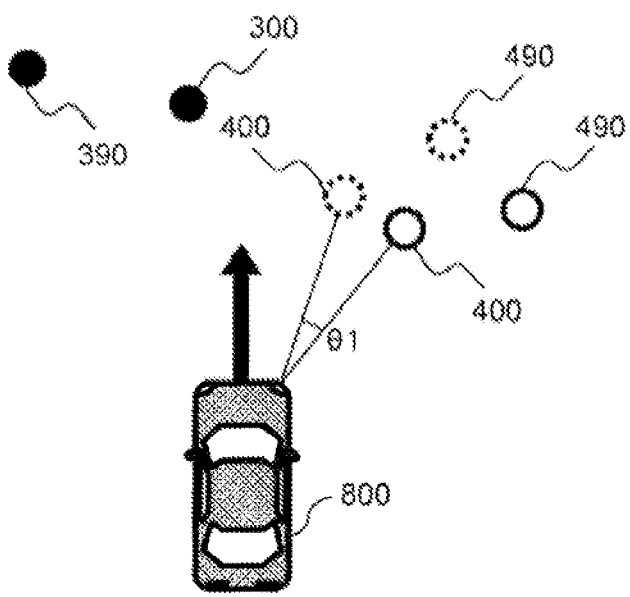
FIGS. 2A to 2D is a conceptual diagram illustrating a processing method of the sensor fusion device having the sensor aiming function according to the first embodiment.
Figure 2B:
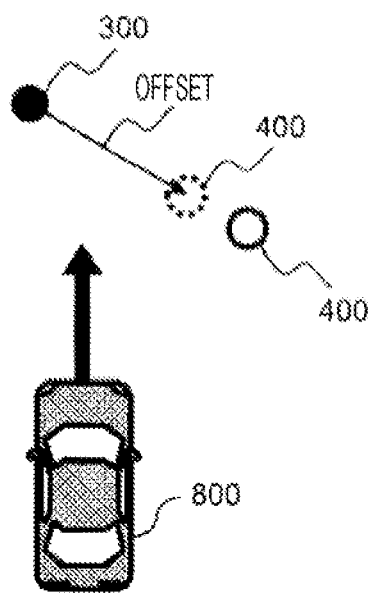
Figure 2C:
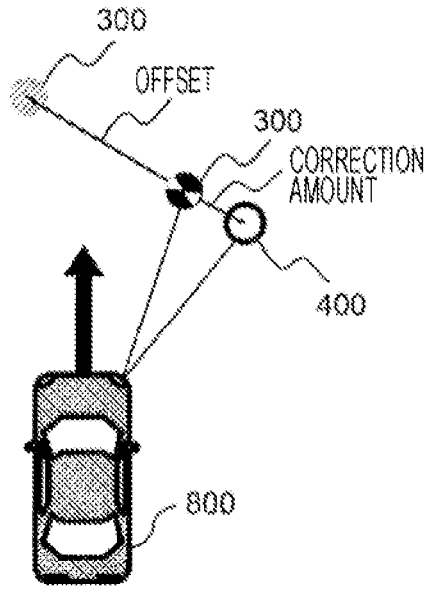

FIGS. 2A to 2C illustrate the concept of the processing method in a state where the second vehicle periphery monitoring sensor 10b is attached to the own vehicle 800 while being axially deviated in the horizontal direction by an angle 91, the first vehicle periphery monitoring sensor 10a detects the first target 300 and the first non-target 390 which are one detection point, and the second vehicle periphery monitoring sensor 10b detects the second target 400 and the second non-target 490 which are one detection point. FIG. 2A illustrates sensor information before target extraction, FIG. 2B illustrates position information of the extracted target, and FIG. 2C illustrates position information of the target after offset erasure. In the drawings, the second target 400 and the second non-target 490 represented by solid lines indicate positions observed by the second vehicle periphery monitoring sensor 10b, and the second target 400 and the second non-target 490 represented by broken lines indicate true positions.

As illustrated in FIG. 2A, the first vehicle periphery monitoring sensor 10a detects the first target 300 and the first non-target 390, and outputs at least relative coordinates of the first target 300 and the first non-target 390 with respect to the own vehicle 800. The second vehicle periphery monitoring sensor 10b detects the second target 400 and the second non-target 490, and outputs at least relative coordinates of the second target 400 and the second non-target 490 to the own vehicle 800. When each of the target and the non-target is a mobile object, the absolute speed may also be output.

The target positional relationship processing unit 110 generates a relative positional relationship between the first target 300 and the second target 400. Specifically, the position information and the target type of the first target 300 and the position information and the target type of the second target 400 are received as inputs from the target positional relationship information storage unit 120, and are converted into a relative positional relationship between the first target 300 and the second target 400. In addition, the target positional relationship processing unit 110 outputs an axis deviation allowable range determined in advance for each vehicle periphery monitoring sensor 10 to the sensor observation information processing unit 100. The target positional relationship processing unit 110 also outputs the relative positional relationship between the first target 300 and the second target 400, the type of the first target 300, and the type of the second target 400 to the position estimation unit 130.

Figure 2D:
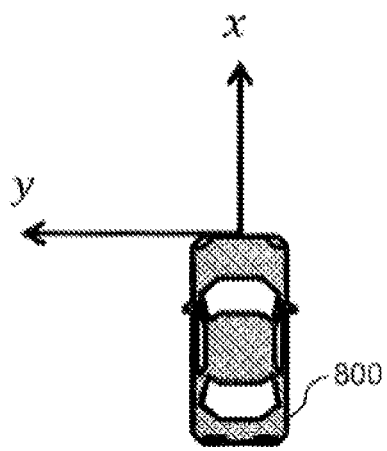

Here, the relative positional relationship is unified relative coordinates of the second target 400 starting from the first target 300 or unified relative coordinates of the first target 300 starting from the second target 400, and is calculated by the coordinates of the targets 300 and 400 whose positions are recorded in the target positional relationship information storage unit 120. In addition, the unified relative coordinates are a coordinate system in which coordinates based on the data output from the plurality of vehicle periphery monitoring sensors 10a and 10b are collected. For example, as illustrated in FIG. 2D, an x-axis is defined in the forward direction of the own vehicle 800 and a y-axis is defined in the leftward direction of the own vehicle 800 with the center of the front end of the own vehicle 800 as a starting point.

The sensor observation information processing unit 100 mainly performs coordinate conversion of input sensor data, time synchronization of detection results between sensors, and target determination.

A coordinate conversion unit 100a of the sensor data transforms the relative coordinates between the first target 300 and the own vehicle 800, the relative coordinates between the first non-target 390 and the own vehicle 800, the relative coordinates between the second target 400 and the own vehicle 800, and the relative coordinates between the second non-target 490 and the own vehicle 800 into the unified relative coordinates with the own vehicle 800 using the coordinate conversion parameters.

The detection results of the speed, the yaw rate, and the steering angle of the own vehicle 800 by the own vehicle behavior detection sensor 20 are input to a time synchronization unit 100b that synchronizes the detection times between the sensors. Using the input detection results of the speed, the yaw rate, and the steering angle of the own vehicle 800, the time synchronization unit 100b corrects the unified relative coordinates of the first target 300, the unified relative coordinates of the first non-target 390, the unified relative coordinates of the second target 400, and the unified relative coordinates of the second non-target 490 to the unified relative coordinates at a predetermined timing, and synchronizes the times of the detection results of the respective sensors. The unified relative coordinates of the time-synchronized first target 300, the unified relative coordinates of the time-synchronized first non-target 390, the unified relative coordinates of the time-synchronized second target 400, and the unified relative coordinates of the time-synchronized second non-target 490 are output to the data integration unit 200 and a target determination unit 100c. When the targets and the non-targets are mobile objects, the absolute speed may also be output.

The target determination unit 100c determines a target. Specifically, the target determination unit 100c receives, from the time synchronization unit 100b, the unified relative coordinates of the time-synchronized first target 300, the unified relative coordinates of the time-synchronized first non-target 390, the unified relative coordinates of the time-synchronized second target 400, the unified relative coordinates of the time-synchronized second non-target 490, and the axis deviation allowable range as inputs. The target determination unit 100c extracts the first target 300 and the second target 400 based on the axis deviation allowable ranges of the vehicle periphery monitoring sensor 10a and the vehicle periphery monitoring sensor 10b, and outputs the unified relative coordinates of the first target 300 and the unified relative coordinates of the second target 400 to the position estimation unit 130 (see FIG. 2B).

Further, the sensor observation information processing unit 100 outputs the unified relative coordinates and the absolute speed of the time-synchronized first target 300, the unified relative coordinates and the absolute speed of the time-synchronized first non-target 390, the unified relative coordinates and the absolute speed of the time-synchronized second target 400, and the unified relative coordinates and the absolute speed of the time-synchronized second non-target 490 to the data integration unit 200. In addition, the sensor observation information processing unit 100 outputs the unified relative coordinates of the second target 400 to a correction value estimation unit 140.

The data integration unit 200 integrates all input information and outputs an integration result to a driving control device 2. The driving control device 2 is an automatic driving system (AD-ECU) or a driving assistance system that controls the driving of the vehicle using the output from the sensor fusion device 1.

The position estimation unit 130 estimates true unified relative coordinates of the second target 400. Specifically, the relative positional relationship between the first target 300 and the second target 400, the type of the first target 300, the type of the second target 400, the unified relative coordinates of the first target 300, and the unified relative coordinates of the second target 400 are input to the position estimation unit 130. Using the relative positional relationship between the first target 300 and the second target 400 acquired from the target positional relationship processing unit 110 (whose positions are recorded in the target positional relationship information storage unit 120), the position estimation unit 130 erases offsets of the x-axis (vertical) direction and the y-axis (horizontal) position of the first target 300 and the second target 400 (see FIG. 2C). The position of the first target 300 after offset erasure is the true position of the second target 400. The unified relative coordinates of the first target 300, the type of the first target 300, the unified relative coordinates of the second target 400, and the type of the second target 400 after offset erasure are output to the correction amount estimation unit 140.

The correction amount estimation unit 140 estimates the deviation amount and calculates the correction amount. Specifically, a deviation amount estimation unit 140a receives, as inputs, the unified relative coordinates of the first target 300, the type of the first target 300, the unified relative coordinates of the second target 400, and the type of the second target 400 after offset erasure, and calculates the axis deviation amount of the second vehicle periphery monitoring sensor 10b by using the unified relative coordinates of the mounting position of the first vehicle periphery monitoring sensor 10a and the unified relative coordinates of the mounting position of the second vehicle periphery monitoring sensor 10b using a calculation method corresponding to the type of the first target 300 and the type of the second target 400. A correction amount calculation unit 140b calculates a sensor coordinate conversion correction value on the basis of the axis deviation amount of the second vehicle periphery monitoring sensor 10b calculated by the deviation amount estimation unit 140a, and outputs the sensor coordinate conversion correction value to the sensor observation information processing unit 100.

The sensor observation information processing unit 100 (the coordinate conversion unit 100a of the sensor data) changes the coordinate conversion parameter on the basis of the sensor coordinate conversion correction value received from the correction amount estimation unit 140. Note that the correction amount estimation unit 140 may calculate the coordinate conversion parameter and output the changed coordinate conversion parameter to the sensor observation information processing unit 100.

Figure 3A:
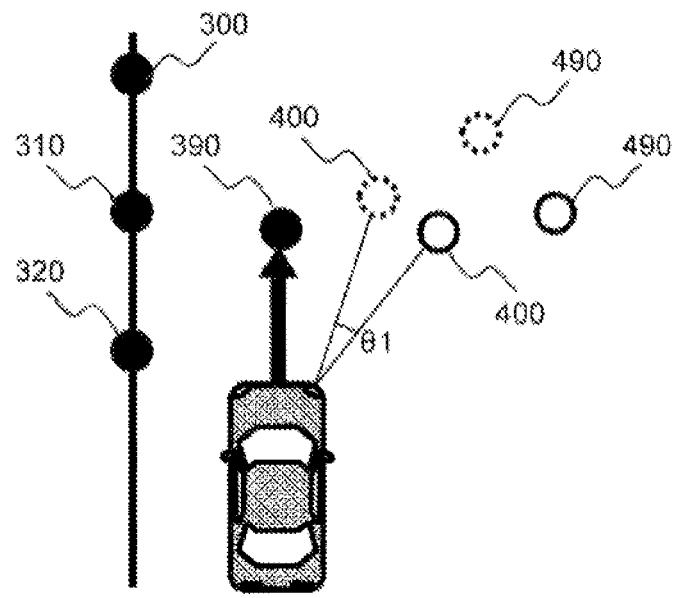
FIGS. 3A to 3C is a conceptual diagram illustrating a processing method of the sensor fusion device having the sensor aiming function according to the first embodiment.
Figure 3B:
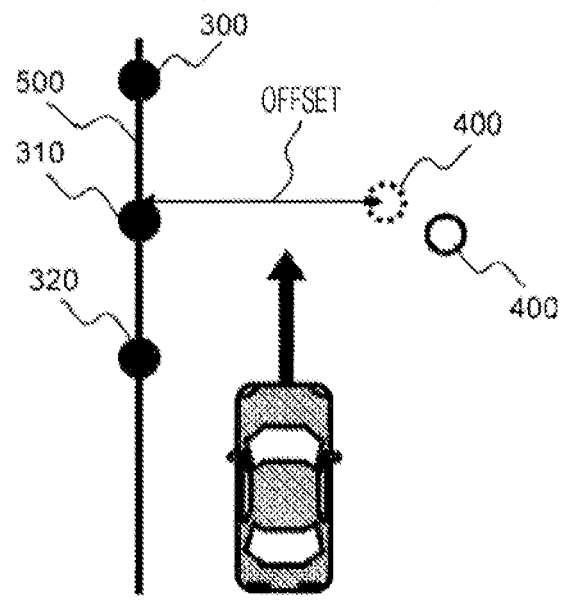
Figure 3C:
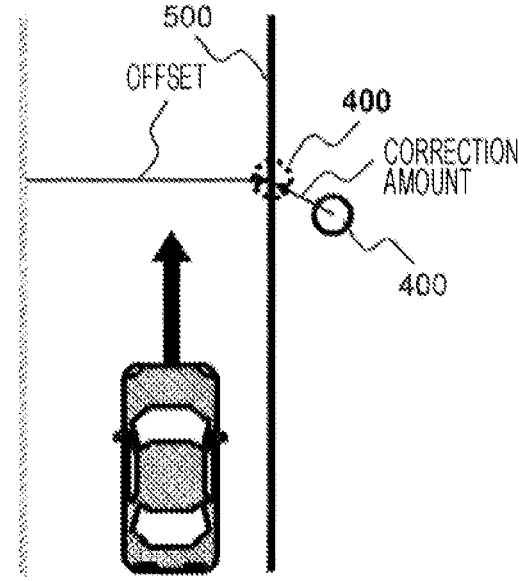

FIGS. 3A to 3C illustrate the concept of the processing method in a state where the second vehicle periphery monitoring sensor 10b is attached to the own vehicle 800 while being axially deviated in the horizontal direction by the angle θ1, the first vehicle periphery monitoring sensor 10a detects the first targets 300, 310, and 320 and the first non-target 390 which are detection points having a constant array pattern, and the second vehicle periphery monitoring sensor 10b detects the second target 400 and the second non-target 490 which are one detection point. FIG. 3A illustrates sensor information before target extraction, FIG. 3B illustrates position information of the extracted target, and FIG. 3C illustrates position information of the target after offset erasure. In the drawings, the second target 400 and the second non-target 490 represented by solid lines indicate positions observed by the second vehicle periphery monitoring sensor 10b, and the second target 400 and the second non-target 490 represented by broken lines indicate true positions.

Regarding the processing flow in the state of FIGS. 3A to 3C, differences in the processing flow in the state of FIGS. 2A to 2D will be mainly described below.

As illustrated in FIG. 3A, the first vehicle periphery monitoring sensor 10a detects the first targets 300 to 320 and the first non-target 390, and outputs at least relative coordinates of the first targets 300 to 320 and the first non-target 390 with respect to the own vehicle 800. The second vehicle periphery monitoring sensor 10b detects the second target 400 and the second non-target 490, and outputs at least relative coordinates of the second target 400 and the second non-target 490 to the own vehicle 800. The first targets 300 to 320 are components of a road structure having a periodic array pattern at intervals of several meters or less. In addition, in a case where the targets and the non-targets each are mobile objects, the absolute speed may also be output.

The target positional relationship processing unit 110 generates a relative positional relationship between the first targets 300 to 320 and the second target. Specifically, the position information and the target types of the first targets 300 to 320, the position information and the target types of the second target 400 are received as inputs from the target positional relationship information storage unit 120, and are converted into the relative positional relationship between the first targets 300 to 320 and the second target 400. The axis deviation allowable range is output to the sensor observation information processing unit 100. In addition, the relative positional relationship between a first road structure 500 and the second target 400 having a specific array pattern including the first targets 300 to 320, the types of the first targets 300 to 320, and the type of the second target 400 are output to the position estimation unit 130.

The sensor observation information processing unit 100 mainly performs coordinate conversion of input sensor data, time synchronization of detection results between sensors, and target determination.

The coordinate conversion unit 100a of the sensor data converts the relative coordinates between the first targets 300 to 320 and the own vehicle 800, the relative coordinates between the first non-target 390 and the own vehicle 800, the relative coordinates between the second target 400 and the own vehicle 800, and the relative coordinates between the second non-target 490 and the own vehicle 800 into the unified relative coordinates with the own vehicle 800 using the coordinate conversion parameters.

The detection results of the speed, the yaw rate, and the steering angle of the own vehicle 800 by the own vehicle behavior detection sensor 20 are input to the time synchronization unit 100b that synchronizes the detection times between the sensors. The time synchronization unit 100b uses the input detection results of the speed, the yaw rate, and the steering angle of the own vehicle 800 to correct the unified relative coordinates of the first targets 300 to 320, the unified relative coordinates of the first non-target 390, the unified relative coordinates of the second target 400, and the unified relative coordinates of the second non-target 490 to the unified relative coordinates at a predetermined timing, thereby synchronizing the times of the detection results of the respective sensors. The unified relative coordinates of the time-synchronized first targets 300 to 320, the unified relative coordinates of the time-synchronized first non-target 390, the unified relative coordinates of the time-synchronized second target 400, and the unified relative coordinates of the time-synchronized second non-target 490 are output to the data integration unit 200 and the target determination unit 100c. When the targets and the non-targets are mobile objects, the absolute speed may also be output.

The target determination unit 100c determines a target. Specifically, the target determination unit 100c receives, from the time synchronization unit 100b, the unified relative coordinates of the time-synchronized first targets 300 to 320, the unified relative coordinates of the time-synchronized first non-target 390, the unified relative coordinates of the time-synchronized second target 400, the unified relative coordinates of the time-synchronized second non-target 490, and the axis deviation allowable range as inputs. The target determination unit 100c extracts the first targets 300 to 320 and the second target 400 based on the axis deviation allowable ranges of the vehicle periphery monitoring sensor 10a and the vehicle periphery monitoring sensor 10b, and outputs the unified relative coordinates of the first targets 300 to 320 and the unified relative coordinates of the second target 400 to the position estimation unit 130 (see FIG. 3B).

Further, the sensor observation information processing unit 100 outputs the unified relative coordinates and the absolute speeds of the time-synchronized first targets 300 to 320, the unified relative coordinates and the absolute speed of the time-synchronized first non-target 390, the unified relative coordinates and the absolute speed of the time-synchronized second target 400, and the unified relative coordinates and the absolute speed of the time-synchronized second non-target 490 to the data integration unit 200. In addition, the sensor observation information processing unit 100 outputs the unified relative coordinates of the second target 400 to the correction value estimation unit 140.

The position estimation unit 130 estimates a true lateral position of the second target 400. Specifically, the relative positional relationship between the first targets 300 to 320 and the second target 400, the types of the first targets 300 to 320, the type of the second target 400, the unified relative coordinates of the first targets 300 to 320, and the unified relative coordinates of the second target 400 are input to the position estimation unit 130. The position estimation unit 130 calculates a lateral position of the first road structure 500 having a specific array pattern including the first targets 300 to 320 in the unified coordinate system as viewed from the own vehicle 800 based on the unified relative coordinates of the first targets 300 to 320 and the target type. Next, using the relative positional relationship between the second target 400 and the first road structure 500 (whose positions are recorded in the target positional relationship information storage unit 120) acquired from the target positional relationship processing unit 110, offsets in the x-axis (vertical) direction and the y-axis (horizontal) direction of the first target 300 and the first road structure 500 are erased (see FIG. 3C). The lateral position of the first road structure 500 after offset erasure is the true lateral position of the second target 400. The lateral position in the unified relative coordinates of the first road structure 500 after offset erasure, the type of the first targets 300 to 320, the unified relative coordinates of the second target 400, and the type of the second target 400 are output to the correction amount estimation unit 140.

The correction amount estimation unit 140 estimates the deviation amount and calculates the correction amount. Specifically, the deviation amount estimation unit 140a receives, as input s, the unified relative coordinates of the first target 300, the types of the first targets 300 to 320, the unified relative coordinates of the first road structure 500, and the type of the second target 400 after offset erasure, and calculates the axis deviation amount of the second vehicle periphery monitoring sensor 10b by using the unified relative coordinates of the mounting position of the first vehicle periphery monitoring sensor 10a and the unified relative coordinates of the mounting position of the second vehicle periphery monitoring sensor 10b using a calculation method corresponding to the types of the first targets 300 to 320 and the type of the second target 400. The correction amount calculation unit 140b calculates a sensor coordinate conversion correction value on the basis of the axis deviation amount of the second vehicle periphery monitoring sensor 10b calculated by the deviation amount estimation unit 140a, and outputs the sensor coordinate conversion correction value to the sensor observation information processing unit 100.

Figure 4A:
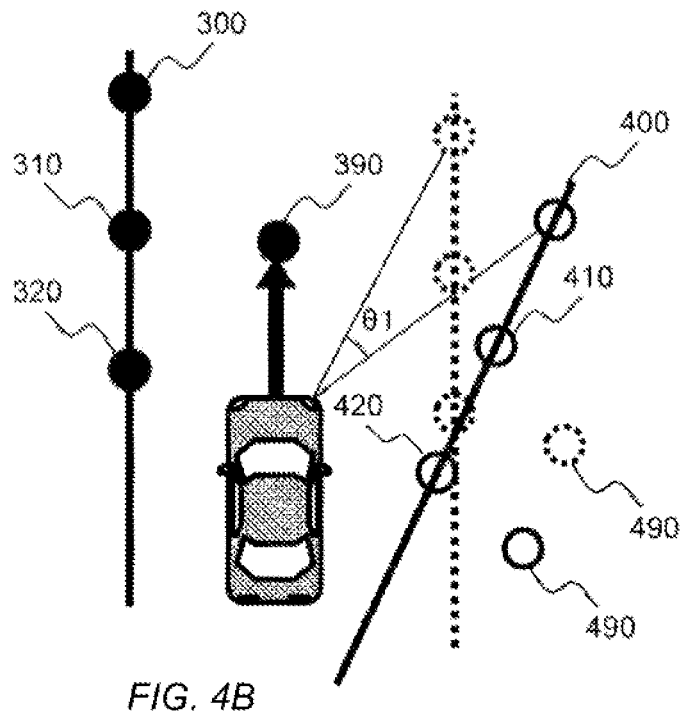
FIGS. 4A to 4C is a conceptual diagram illustrating a processing method of the sensor fusion device having the sensor aiming function according to the first embodiment.
Figure 4B:
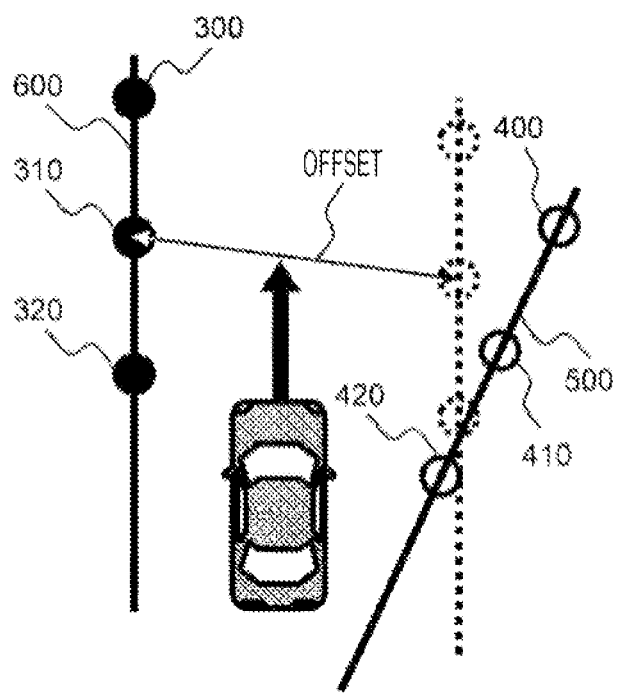
Figure 4C:
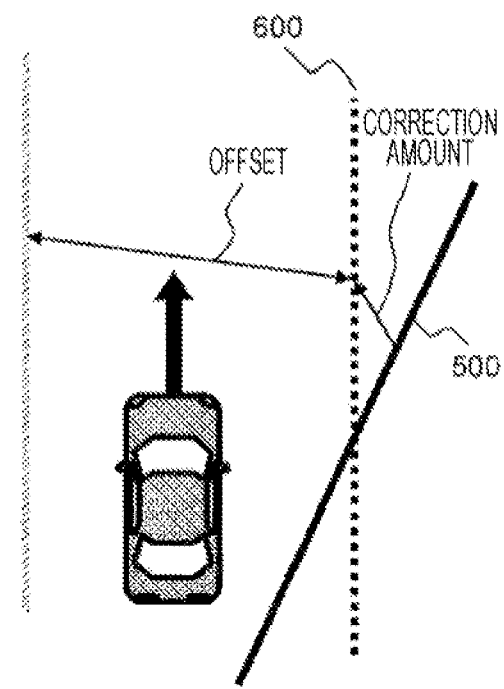

FIGS. 4A to 4C illustrate the concept of the processing method in a state in which the second vehicle periphery monitoring sensor 10b is attached to the own vehicle 800 while being axially deviated in the horizontal direction by the angle θ1, the first vehicle periphery monitoring sensor 10a detects the first targets 300, 310, and 320 which are detection points having a certain array pattern, and the second vehicle periphery monitoring sensor 10b detects the second targets 400, 410, and 420 which are detection points having a certain array pattern. FIG. 4A illustrates sensor information before target extraction, FIG. 4B illustrates position information of the extracted target, and FIG. 4C illustrates position information of the target after offset erasure. In the drawings, the second target 400 and the second non-target 490 represented by solid lines indicate positions observed by the second vehicle periphery monitoring sensor 10b, and the second target 400 and the second non-target 490 represented by broken lines indicate true positions.

Regarding the processing flow in the state of FIGS. 4A to 4C, differences in the processing flow in the state of FIGS. 3A to 3c will be mainly described below.

As illustrated in FIG. 4A, the first vehicle periphery monitoring sensor 10a detects the first targets 300 to 320 and the first non-target 390, and outputs at least relative coordinates of the first targets 300 to 320 and the first non-target 390 with respect to the own vehicle 800. The second vehicle periphery monitoring sensor 10b detects the second targets 400 to 420 and the second non-target 490, and outputs at least relative coordinates of the second targets 400 to 420 and the second non-target 490 to the own vehicle 800. The first targets 300 to 320 are components of a road structure having a periodic array pattern at intervals of several meters or less. The second targets 400 to 420 are components of a road structure having a periodic array pattern at intervals of several meters or less. In addition, in a case where the targets and the non-targets each are mobile objects, the absolute speed may also be output.

The target positional relationship processing unit 110 generates a relative positional relationship between the first road structure 500 having a specific array pattern including the first targets 300 to 320 and a second road structure 600 having a specific array pattern including the second targets 400 to 420. Specifically, the position information and the target types of the first targets 300 to 320 and the position information and the target types of the second targets 400 to 420 are received as inputs from the target positional relationship information storage unit 120, and are converted into a relative positional relationship between the first road structure 500 and the second road structure 600. The axis deviation allowable range is output to the sensor observation information processing unit 100. In addition, the target positional relationship processing unit 110 outputs the relative positional relationship between the first road structure 500 and the second road structure 600, the types of the first targets 300 to 320, and the types of the second targets 400 to 420 to the position estimation unit 130.

The sensor observation information processing unit 100 mainly performs coordinate conversion of input sensor data, time synchronization of detection results between sensors, and target determination.

The coordinate conversion unit 100a converts the coordinates of the sensor data. Specifically, the coordinate conversion unit 100a converts the relative coordinates between the first targets 300 to 320 and the own vehicle 800, the relative coordinates between the first non-target 390 and the own vehicle 800, the relative coordinates between the second targets 400 to 420 and the own vehicle 800, and the relative coordinates between the second non-target 490 and the own vehicle 800 into the unified relative coordinates with the own vehicle 800 using the coordinate conversion parameters.

The time synchronization unit 100b synchronizes time between pieces of sensor data detected at different times. Specifically, the detection results of the speed, the yaw rate, and the steering angle of the own vehicle 800 by the own vehicle behavior detection sensor 20 are input to the time synchronization unit 100b. The time synchronization unit 100b uses the input detection results of the speed, the yaw rate, and the steering angle of the own vehicle 800 to correct the unified relative coordinates of the first targets 300 to 320, the unified relative coordinates of the first non-target 390, the unified relative coordinates of the second targets 400 to 420, and the unified relative coordinates of the second non-target 490 to the unified relative coordinates at a predetermined timing, thereby synchronizing the times of the detection results of the respective sensors. The unified relative coordinates of the time-synchronized first targets 300 to 320, the unified relative coordinates of the time-synchronized first non-target 390, the unified relative coordinates of the time-synchronized second targets 400 to 420, and the unified relative coordinates of the time-synchronized second non-target 490 are output to the data integration unit 200 and the target determination unit 100c. When the targets and the non-targets are mobile objects, the absolute speed may also be output.

The target determination unit 100c determines a target. Specifically, the target determination unit 100c receives, from the time synchronization unit 100b, the unified relative coordinates of the time-synchronized first targets 300 to 320, the unified relative coordinates of the time-synchronized first non-target 390, the unified relative coordinates of the time-synchronized second targets 400 to 420, the unified relative coordinates of the time-synchronized second non-target 490, and the axis deviation allowable range as inputs. The target determination unit 100c extracts the first targets 300 to 320 and the second targets 400 to 420 based on the axis deviation allowable ranges of the vehicle periphery monitoring sensor 10a and the vehicle periphery monitoring sensor 10b, and outputs the unified relative coordinates of the first targets 300 to 320 and the unified relative coordinates of the second targets 400 to 420 to the position estimation unit 130 (see FIG. 4B).

Further, the sensor observation information processing unit 100 outputs the unified relative coordinates and the absolute speeds of the time-synchronized first targets 300 to 320, the unified relative coordinates and the absolute speed of the time-synchronized first non-target 390, the unified relative coordinates and the absolute speed of the time-synchronized second targets 400 to 420, and the unified relative coordinates and the absolute speed of the time-synchronized second non-target 490 to the data integration unit 200. In addition, the sensor observation information processing unit 100 outputs the unified relative coordinates of the second targets 400 to 420 to the correction value estimation unit 140.

The position estimation unit 130 estimates an approximate function in true unified relative coordinates of the second road structure 600 constituted by the second targets 400 to 420. Specifically, the relative positional relationship between the first targets 300 to 320 and the second targets 400 to 420, the types of the first targets 300 to 320, the types of the second targets 400 to 420, the unified relative coordinates of the first targets 300 to 320, and the unified relative coordinates of the second targets 400 to 420 are input to the position estimation unit 130. Based on the unified relative coordinates of the first targets 300 to 320 and the target type, the position estimation unit 130 calculates an approximate function in the unified relative coordinates of the first road structure 500 having a specific array pattern including the first targets 300 to 320 as viewed from the own vehicle 800. In addition, the position estimation unit 130 calculates an approximate function in the unified relative coordinates of the second road structure 600 having a specific array pattern including the second targets 400 to 420 as viewed from the own vehicle 800 based on the unified relative coordinates of the second targets 400 to 420 and the target type. Next, using the relative positional relationship between the first road structure 500 and the second road structure 600 (whose positions are recorded in the target positional relationship information storage unit 120) acquired from the target positional relationship processing unit 110, offsets in the x-axis (vertical) direction and the y-axis (horizontal) direction of the first road structure 500 and the second road structure 600 are erased (see FIG. 4C). The approximate function in the unified relative coordinates of the first road structure 500 after offset erasure is the true approximate function of the second road structure 600. The approximate function in the unified relative coordinates of the first road structure 500, the types of the first targets 300 to 320, the approximate function in the unified relative coordinates of the second road structure 600, and the types of the second targets 400 to 420 after offset erasure are output to the correction amount estimation unit 140.

The correction amount estimation unit 140 estimates the deviation amount and calculates the correction amount. Specifically, the deviation amount estimation unit 140a receives, as inputs, the approximate function of the first road structure 500, the types of the first targets 300 to 320, the unified relative coordinates of the second road structure 600, and the types of the second targets 400 to 420 after offset erasure, and calculates the axis deviation amount of the second vehicle periphery monitoring sensor 10b by using the unified relative coordinates of the mounting position of the first vehicle periphery monitoring sensor 10a and the unified relative coordinates of the mounting position of the second vehicle periphery monitoring sensor 10b using a calculation method corresponding to the types of the first targets 300 to 320 and the types of the second targets 400 to 420. The correction amount calculation unit 140b calculates a sensor coordinate conversion correction value on the basis of the axis deviation amount of the second vehicle periphery monitoring sensor 10b calculated by the deviation amount estimation unit 140a, and outputs the sensor coordinate conversion correction value to the sensor observation information processing unit 100.

In the sensor fusion device 1 of the present embodiment, the correction amount based on the horizontal axis deviation amount (angle θ1) of the second vehicle periphery monitoring sensor 10b can be obtained using the relative positional relationship between the targets as described above, and the positions of the objects acquired by the plurality of vehicle periphery monitoring sensors 10 can be integrated into the unified relative coordinates.

Next, an example of sensor aiming using an actually installed road structure will be described with reference to FIGS. 5 to 9. Consider a case where the first vehicle periphery monitoring sensor 10a is a camera and the second vehicle periphery monitoring sensor 10b is a radar.

Figure 5:
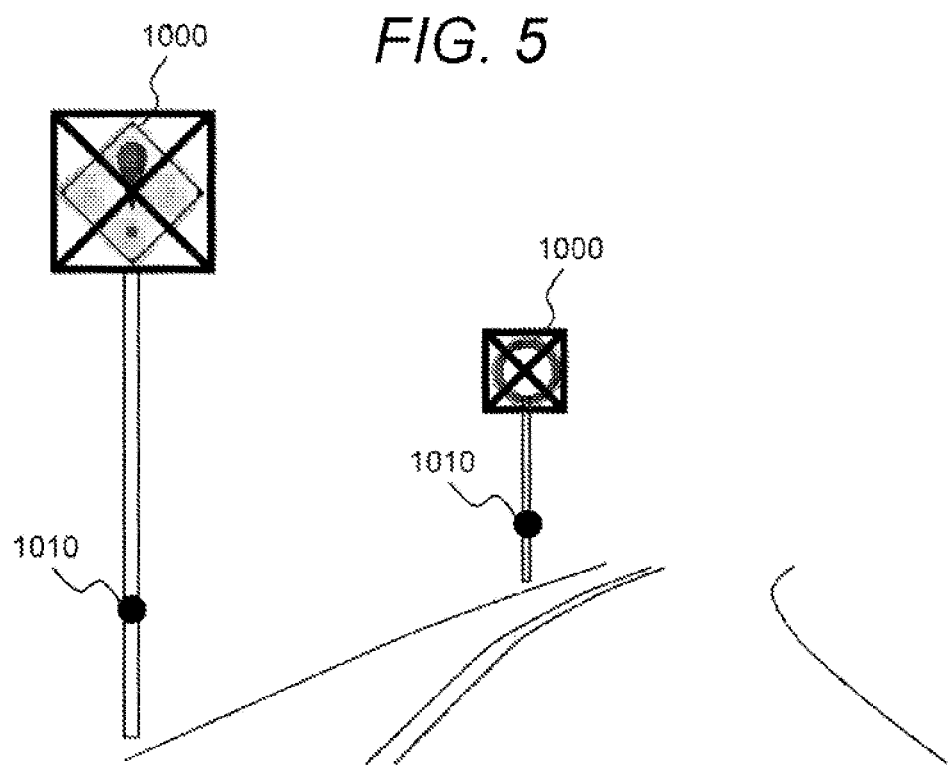
FIG. 5 is a diagram illustrating an example of a sensor aiming process using a road structure according to the first embodiment.

FIG. 5 is a diagram illustrating an observation result of a road sign by a vehicle periphery monitoring sensor 10.

Regarding a road sign as a road structure, the first vehicle periphery monitoring sensor 10a (camera) observes a sign plate 1000, which is a structure having a certain size, as the first target 300. On the other hand, the second vehicle periphery monitoring sensor 10b (radar) detects a support column 1010 as the second target 400.

In the sign as a road structure, since the size of the sign plate 1000 and the plate bottom height (the length of the support column 1010) are determined, the position estimation unit 130 calculates the offset of the first target 300 using the relative positional relationship between the first target 300 (the sign plate 1000) and the second target 400 (the support column 1010), and erases the offset of the first target 300 using the observed position and the relative positional relationship of the first target 300. The correction amount estimation unit 140 calculates an axis deviation amount of the second vehicle periphery monitoring sensor 10b and a correction amount associated with the axis deviation amount using the position of the first target 300 after offset erasure.

Figure 6:
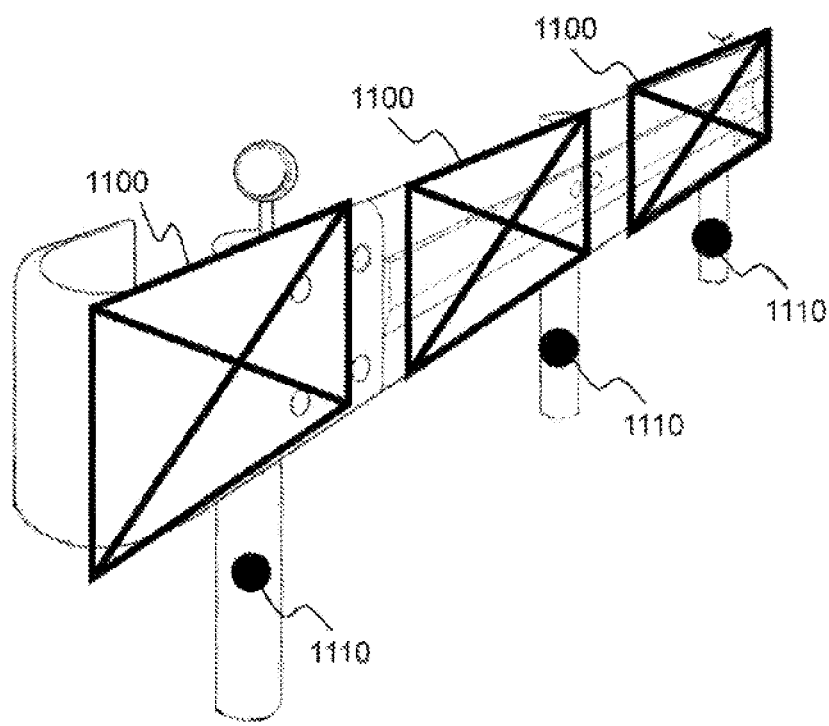
FIG. 6 is a diagram illustrating an example of a sensor aiming process using a road structure according to the first embodiment.

FIG. 6 is a diagram illustrating an observation result of a guardrail by the vehicle periphery monitoring sensor 10.

In the guardrail as a road structure, since the interval between support columns 1110 is determined according to the length of a beam 1100, the first vehicle periphery monitoring sensor 10a (camera) observes the beams 1100, which are structures having a certain size, as the second targets 300, 310, and 320. On the other hand, the second vehicle periphery monitoring sensor 10b (radar) observes the support columns 1110 having a constant array pattern as the second targets 400, 410, and 420.

Since the relative positional relationship between the beam and the support column is determined in the guardrail as a road structure, the position estimation unit 130 calculates the offsets of the first targets 300, 310, and 320 (beams 1100) using the relative positional relationship between the first targets 300, 310, and 320 and the second targets 400, 410, and 420 (support columns 1110), and erases the offsets of the first targets 300, 310, and 320 using the observed positions of the first targets 300, 310, and 320 and the relative positional relationship.

The correction amount estimation unit 140 calculates an axis deviation amount of the second vehicle periphery monitoring sensor 10b and a correction amount associated with the axis deviation amount using the position of the first targets 300, 310, and 320 after offset erasure.

Figure 7:
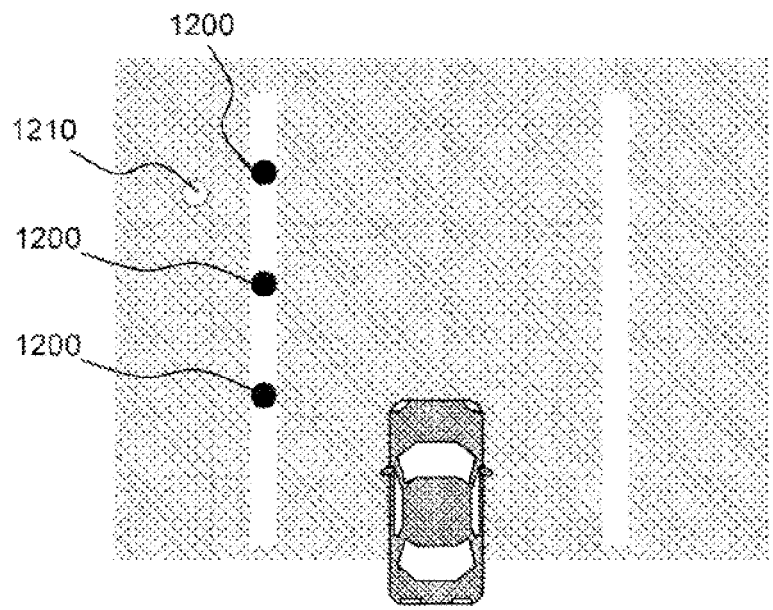
FIG. 7 is a diagram illustrating an example of a sensor aiming process using a road structure according to the first embodiment.

FIG. 7 is a diagram illustrating observation results of white lines and road signs by the vehicle periphery monitoring sensor 10.

The first vehicle periphery monitoring sensor 14a (camera) observes white lines (roadway outer line, lane boundary line, etc.) 1200 painted on the road surface as the first targets 300, 310, and 320. On the other hand, the second vehicle periphery monitoring sensor 10b (radar) detects a road sign 1210 as the second target 400.

The positions of the white lines and the position of the road sign as road structures are measured in advance and recorded in the target positional relationship information storage unit 120. The position estimation unit 130 calculates offsets of the first targets 300, 310, and 320 using the relative positional relationship between the first targets 300, 310, and 320 (white lines 1210) and the second target 400 (road sign 1210), and erases the offsets of the first targets 300, 310, and 320 using the observed positions and the relative positional relationship between the first targets 300, 310, and 320. The correction amount estimation unit 140 calculates an axis deviation amount of the second vehicle periphery monitoring sensor 10b and a correction amount associated with the axis deviation amount using the position of the first targets 300, 310, and 320 after offset erasure.

Figure 8:
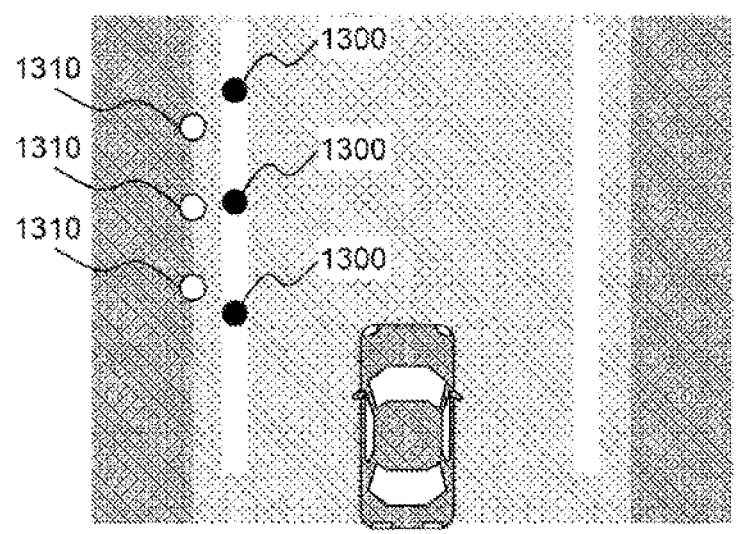
FIG. 8 is a diagram illustrating an example of a sensor aiming process using a road structure according to the first embodiment.

FIG. 8 is a diagram illustrating an observation result of white lines and soundproof walls by the vehicle periphery monitoring sensor 10.

The first vehicle periphery monitoring sensor 10a (camera) observes white lines (roadway outer line, lane boundary line, etc.) 1300 painted on the road surface as the first targets 300, 310, and 320. On the other hand, the second vehicle periphery monitoring sensor 10b (radar) detects soundproof walls 1310 as the second targets 400, 410, and 420.

The positions of the white lines 1300 and the positions of the soundproof walls 1310 as road structures are measured in advance and recorded in the target positional relationship information storage unit 120. The position estimation unit 130 calculates offsets of the first targets 300, 310, and 320 using the relative positional relationship between the first targets 300, 310, and 320 (white lines 1300) and the second targets 400, 410, and 420 (soundproof walls 1310), and erases the offsets of the first targets 300, 310, and 320 using the observed positions and the relative positional relationship between the first targets 300, 310, and 320. The correction amount estimation unit. 140 calculates an axis deviation amount of the second vehicle periphery monitoring sensor 10b and a correction amount associated with the axis deviation amount using the position of the first targets 300, 310, and 320 after offset erasure.

Figure 9:
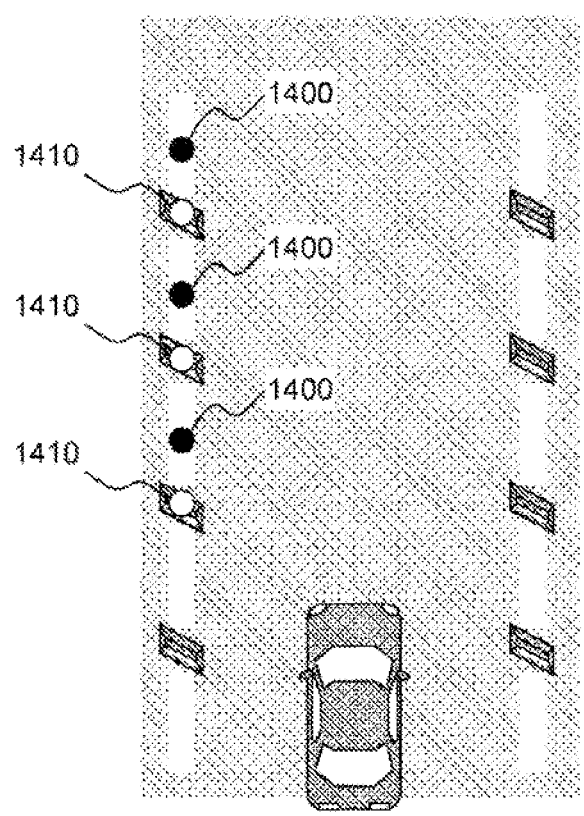
FIG. 9 is a diagram illustrating an example of a sensor aiming process using a road structure according to the first embodiment.

FIG. 9 is a diagram illustrating an observation result of white lines and road studs (chatter bars, cat's eyes, botts dots, etc.) by the vehicle periphery monitoring sensor 10.

The first vehicle periphery monitoring sensor 10a (camera) observes white lines (roadway outer line, lane boundary line, etc.) 1400 painted on the road surface as the first targets 300, 310, and 320. On the other hand, the second vehicle periphery monitoring sensor 10b (radar) detects road studs 1410 as the second targets 400, 410, and 420.

The positions of the white lines and the positions of the road studs as road structures are measured in advance and recorded in the target positional relationship information storage unit 120. The position estimation unit 130 calculates offsets of the first targets 300, 310, and 320 using the relative positional relationship between the first targets 300, 310, and 320 (white lines 1400) and the second targets 400, 410, and 420 (road studs 1410), and erases the offsets of the first targets 300, 310, and 320 using the observed positions and the relative positional relationship between the first targets 300, 310, and 320. The correction amount estimation unit 140 calculates an axis deviation amount of the second vehicle periphery monitoring sensor 10b and a correction amount associated with the axis deviation amount using the position of the first targets 300, 310, and 320 after offset erasure.

Second Embodiment

Figure 10:
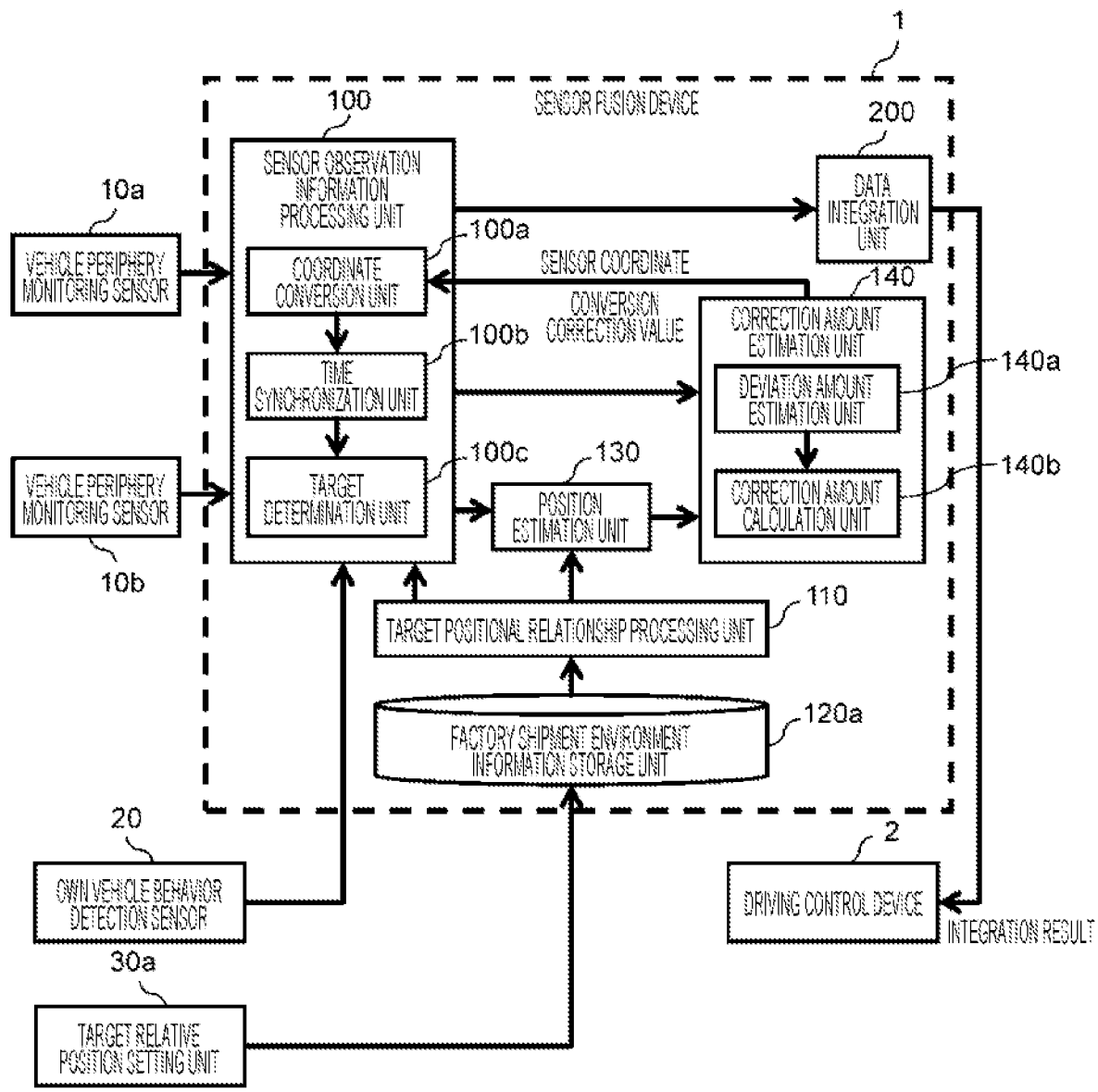
FIG. 10 is a functional block diagram of a sensor fusion device having a sensor aiming function of a second embodiment.

FIG. 10 is a functional block diagram illustrating another embodiment of the sensor fusion device 1 having the sensor aiming function. In the second embodiment, differences from the first embodiment will be mainly described, the same components are denoted by the same reference numerals, and the description thereof will be omitted.

As illustrated in FIG. 10, the sensor fusion device 1 of the present embodiment includes a factory shipment environment information storage unit 120a instead of the target positional relationship information storage unit 120 in the configuration of the first embodiment. The factory shipment environment information storage unit 120a receives factory shipment environment information as an input from a target relative position setting unit 30a, and outputs the information to the target positional relationship processing unit 110 as necessary. The factory shipment environment information storage unit 120a includes position information of the first target 300 observed by the first vehicle periphery monitoring sensor 10a, position information of the second target 400 observed by the second vehicle periphery monitoring sensor 10b, a type of the first target 300, and a type of the second target 400, which are defined in advance for aiming at a factory or a maintenance site. When the relative positional relationship between the own vehicle 800 and the first target 300 and/or the second target 400 is uniquely determined, the unified relative coordinates of the first target 300 and the unified relative coordinates of the second target 400 may be included. In addition, the position information may be absolute coordinates on a map.

In the present embodiment, the factory shipment environment information storage unit 120a is provided, and the sensor aiming is executed by setting the mode to the factory shipment mode, so that the person performing the aiming can construct the surrounding environment for the sensor aiming using the predetermined first target 300 and second target 400, and perform the sensor aiming.

Third Embodiment

Figure 11:
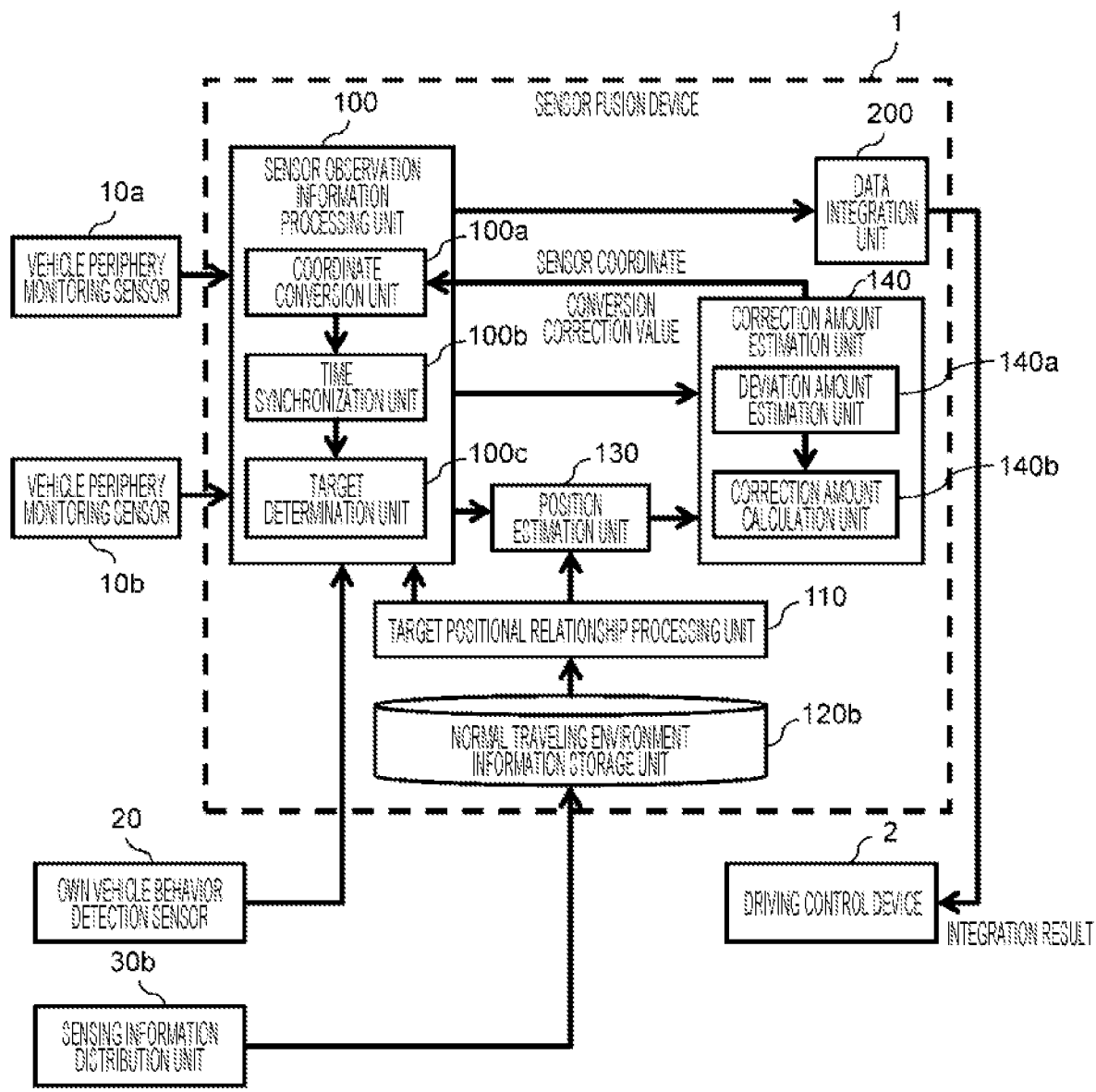
FIG. 11 is a functional block diagram of a sensor fusion device having a sensor aiming function of the third embodiment.

FIG. 11 is a functional block diagram illustrating another embodiment of the sensor fusion device 1 having the sensor aiming function. In the third embodiment, differences from the first embodiment will be mainly described, the same components are denoted by the same reference numerals, and the description thereof will be omitted.

As illustrated in FIG. 11, the sensor fusion device 1 of the present embodiment includes a normal traveling environment information storage unit 120b instead of the target positional relationship information storage unit 120 in the configuration of the first embodiment. The normal traveling environment information storage unit 120b receives normal traveling environment information from a sensing information distribution unit 30b as an input, and outputs the normal traveling environment information to the target positional relationship processing unit 110 as necessary. The normal traveling environment information storage unit 120b includes a traveling position of the own vehicle 800 on the map in the sensing information distribution unit 30b, a type of road structure installed around the own vehicle, and a relative position (for example, array pattern) of the road structure defined by traffic regulations and the like. That is, the normal traveling environment information storage unit 120b includes the absolute coordinates of the first target 300 observed by the first vehicle periphery monitoring sensor 10a, the type of the first target 300, the absolute coordinates of the second target 400, and the type of the second target 400. The normal traveling environment information storage unit 120b may include the relative positional relationship between the first target 300 and the second target 400.

In the present embodiment, the normal traveling environment information storage unit 120b is provided, and the sensor aiming is executed by setting the mode to a normal traveling mode, so that the sensor fusion device 1 can perform the sensor aiming using the observation information (the first target 300, the second target 400) of the first vehicle periphery monitoring sensor 10a and the second vehicle periphery monitoring sensor 10b during the normal traveling.

Fourth Embodiment

Figure 12:
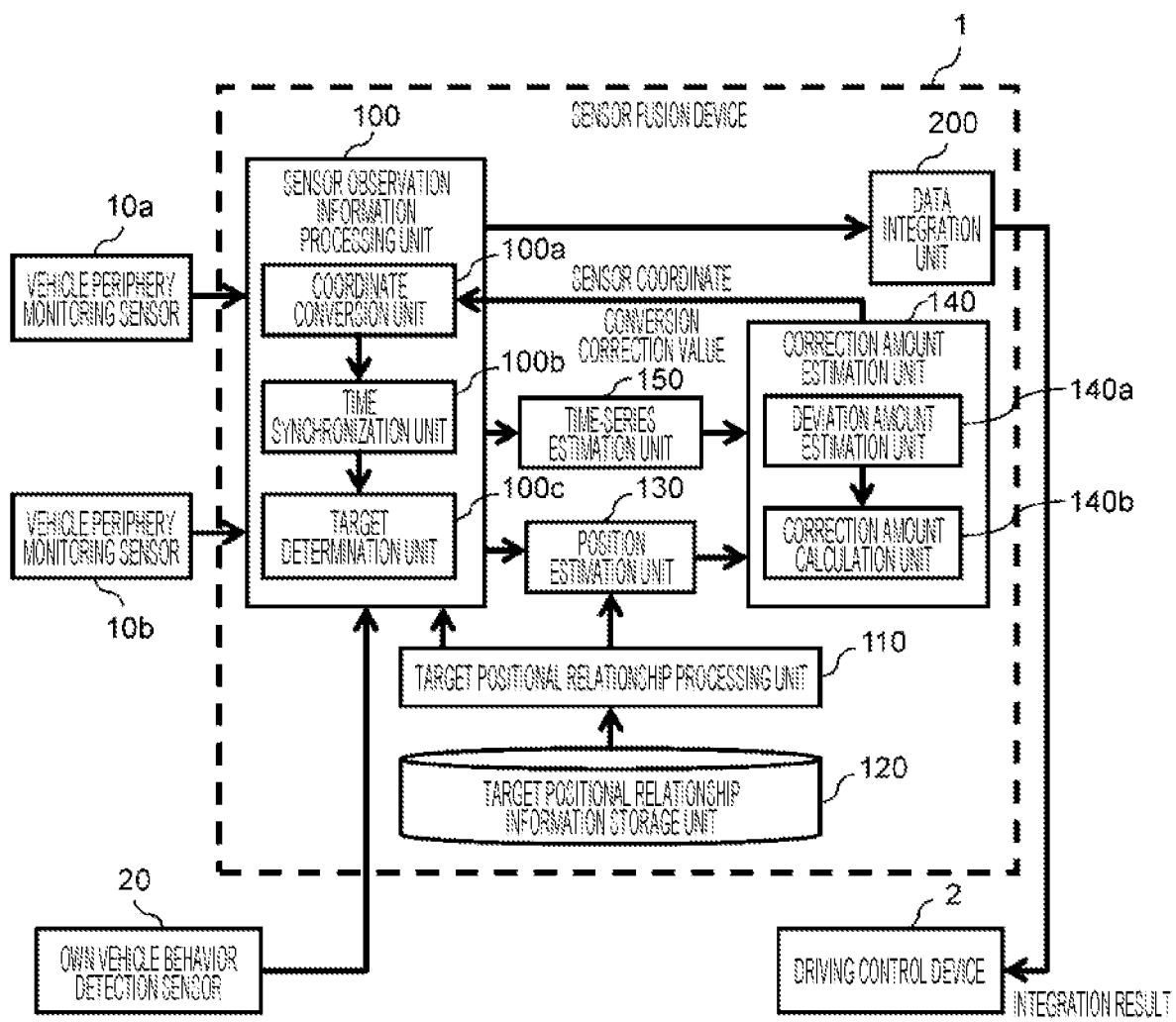
FIG. 12 is a functional block diagram of a sensor fusion device having a sensor aiming function of a fourth embodiment.

FIG. 12 is a functional block diagram illustrating another embodiment of the sensor fusion device 1 having the sensor aiming function. In the fourth embodiment, differences from the first embodiment will be mainly described, the same components are denoted by the same reference numerals, and the description thereof will be omitted.

As illustrated in FIG. 12, the sensor fusion device 1 of the present embodiment includes a time-series estimation unit 150 in addition to the configuration of the first embodiment. The time-series estimation unit 150 receives, as input, the unified relative coordinates and the absolute speed of the first target 300 after offset erasure from the position estimation unit 130, and uses the unified relative coordinates and the absolute speed of the first target 300 to track and accumulate the position of the first target 300 that changes with time, thereby determining that the accumulated data is a constant array pattern, and applying the correction method of FIGS. 3 and 4. By using the time-series position data of the target, it is possible to aim a sensor that requires several frames to recognize the road structure.

According to the fourth embodiment, since the aiming is performed using the plurality of observation points, an error in the aiming can be reduced.

In the embodiment described above, the first and second vehicle periphery monitoring sensors 10a and 10b may be the same type of sensor or different types of sensors. In addition, the vehicle periphery monitoring sensors 10a and 10b may be any sensor such as a millimeter-wave radar, a camera (visible light, near-infrared, mid-infrared, far-infrared camera), a light detection and ranging (LiDAR), a sonar, a time of flight (TOF) sensor, or a combination thereof.

In addition, the configurations, processing flows, and operations of the functional blocks described in each embodiment may be arbitrarily combined.

Further, in the above description, the in-vehicle device (ECU) calculates the sensor coordinate conversion correction value, but a computer communicably connected to the vehicle may calculate the sensor coordinate conversion correction value.

As described above, the sensor fusion device 1 (sensor aiming device) of the present embodiment includes the target positional relationship processing unit 110 that outputs the positional relationship information of the first target 300 and the second target 400, the sensor observation information processing unit 100 that converts the observation result of the first target 300 and the observation result of the second target 400 into a predetermined unified coordinate system according to the coordinate conversion parameter, and extracts the first target information indicating the position of the first target 300 and the second target information indicating the position of the second target 400 in time synchronization at a predetermined timing, the position estimation unit 130 that estimates the position of the second target 400 using the first target information, the second target information, and the positional relationship information, and the correction amount estimation unit 140 that calculates the deviation amount of the second sensor using the second target information and the estimated position of the second target, and estimates the correction amount. Since the coordinate conversion parameter is changed on the basis of the correction amount, the correction amount based on the horizontal axis deviation amount (angle θ1) of the second vehicle periphery monitoring sensor 10b can be obtained using the relative positional relationship between the targets, and the positions of the objects acquired by the plurality of vehicle periphery monitoring sensors 10 can be integrated into the unified relative coordinates.

In addition, since the target positional relationship processing unit 110 outputs the predetermined positional relationship information in the factory shipment mode, the axis deviation of the sensor can be accurately corrected using the predetermined target, and the aiming can be performed regardless of the environment. In addition, it is possible to correct the axis deviation of the sensor using a simple target that can also be used in a maintenance site. In addition, it is possible to accurately correct the axis deviation of the sensor using the target with high recognition accuracy.

In addition, in the normal traveling mode, the position estimation unit 130 extracts the first target information and the second target information using the observation result of the first target 300 and the observation result of the second target 400 during traveling. Therefore, it is possible to correct the axis deviation of the sensor during normal traveling without depending on maintenance.

In addition, since the time-series estimation unit 150 that accumulates the position of the first target 300 that changes with time using the position and the absolute speed in the unified coordinate system of the first target 300, determines the accumulated position to be a constant array pattern, and recognizes the first target using the determined array pattern is provided, it is possible to accurately correct the axis deviation of the sensor using a plurality of observation points.

Further, the present invention is not limited to the above-described embodiments. Various modifications and equivalent configurations may be contained within the scope of claims. For example, the above-described embodiments are given in detail in order to help easy understating of the present invention. The present invention is not limited to be provided all the configurations described above. In addition, some of the configurations of a certain embodiment may be replaced with the configuration of the other embodiment. In addition, the configurations of the other embodiment may be added to the configurations of a certain embodiment. In addition, some of the configurations of each embodiment may be added, omitted, or replaced with respect to the configuration of the other embodiment.

In addition, the above-described configurations, functions, processing units, and processing means may be realized by a hardware configuration by setting some or all of the configurations using an integrated circuit, or may be realized by a software configuration by analyzing and performing a program to realize the functions by the processor.

The information of the program realizing functions, tables, and files may be stored in a memory device such as a memory, a hard disk, a Solid State Drive (SSD) or a recording medium such as an IC card, an SD card, a DVD, and a BD.

In addition, only control lines and information lines considered to be necessary for explanation are illustrated, but not all the control lines and the information lines necessary for mounting are illustrated. In practice, almost all the configurations may be considered to be connected to each other.

REFERENCE SIGNS LIST 1 sensor fusion device
2 driving control device
10a, 10b vehicle periphery monitoring sensor
20 vehicle behavior detection sensor
30a target relative position setting unit
30b sensing information distribution unit
100 sensor observation information processing unit
100a coordinate conversion unit
100b time synchronization unit
100c target determination unit
110 target positional relationship processing unit
120 target positional relationship information storage unit
120a factory shipment environment information storage unit
120b normal traveling environment information storage unit
130 position estimation unit
140 correction amount estimation unit
140a deviation amount estimation unit
140b correction amount calculation unit
150 time-series estimation unit
200 data integration unit

The invention claimed is:

1. A sensor aiming device to which an observation result of a first target by a first sensor and an observation result of a second target by a second sensor; and speed, yaw rate, and steering angle of an own vehicle detected by an own vehicle behavior detection sensor are input, the sensor aiming device comprising:
   one or more processors and one or more non-transitory computer-readable storage media, the non-transitory computer-readable storage media having stored thereon at least:
   a target positional relationship processing unit configured to output positional relationship information of the first target and the second target;
   a sensor observation information processing unit configured to convert the observation result of the first target and the observation result of the second target into a predetermined unified coordinate system according to a coordinate conversion parameter, perform time synchronization based on the speed, yaw rate, and steering angle of the own vehicle at a predetermined timing, and extract first target information indicating a position of the first target and second target information indicating a position of the second target;
   a position estimation unit configured to determine an estimated position of the second target using the first target information, the second target information, and the positional relationship information;
   a correction amount estimation unit configured to calculate a deviation amount of the second sensor using the second target information and the estimated position of the second target and estimate a correction amount, wherein
   the coordinate conversion parameter is changed based on the correction amount; and
   a time-series estimation unit configured to accumulate, using the position and an absolute speed of the first target in the unified coordinate system, the position of the first target that changes with time, determine the accumulated position as a constant array pattern, and recognize the first target using the determined array pattern.

2. The sensor aiming device according to claim 1, wherein the first target and the second target are components of one road structure.

3. The sensor aiming device according to claim 1, wherein the first target and the second target are different objects.

4. The sensor aiming device according to claim 1, wherein the target positional relationship processing unit outputs predetermined positional relationship information in a factory shipment mode.

5. The sensor aiming device according to claim 1, wherein the position estimation unit extracts the first target information and the second target information using the observation result of the first target and the observation result of the second target during traveling in a normal traveling mode.

6. A driving control system that controls driving of a vehicle, the driving control system comprising:
a sensor fusion device configured to integrate and output observation results of two or more object sensors; and speed, yaw rate, and steering angle of an own vehicle detected by an own vehicle behavior detection sensor; and
a driving control device, wherein
the sensor fusion device receives an observation result of a first target by a first sensor and an observation result of a second target by a second sensor as inputs,
the sensor fusion device comprising one or more processors and one or more non-transitory computer-readable storage media, the non-transitory computer-readable storage media having stored thereon at least
a target positional relationship processing unit configured to output positional relationship information of the first target and the second target,
a sensor observation information processing unit configured to convert the observation result of the first target and the observation result of the second target into a predetermined unified coordinate system according to a coordinate conversion parameter, perform time synchronization perform time synchronization based on the speed, yaw rate, and steering angle of the own vehicle at a predetermined timing, and extract first target information indicating a position of the first target and second target information indicating a position of the second target,
a position estimation unit configured to determine an estimated position of the second target using the first target information, the second target information, and the positional relationship information,
a correction amount estimation unit configured to calculate a deviation amount of the second sensor using the second target information and the estimated position of the second target and estimate a correction amount, wherein
the coordinate conversion parameter is changed based on the correction amount; and
a time-series estimation unit configured to accumulate, using the position and an absolute speed of the first target in the unified coordinate system, the position of the first target that changes with time, determine the accumulated position as a constant array pattern, and recognize the first target using the determined array pattern; and
wherein the driving control device is configured to control driving of the vehicle based in part on the estimated position of the second target.

7. An estimation method of a correction amount of sensor data executed by a sensor aiming device that calculates a correction parameter of an observation result of a sensor using observation results of two or more sensors, the estimation method comprising:
inputting an observation result of a first target by a first sensor and an observation result of a second target by a second sensor;
inputting speed, yaw rate, and steering angle of an own vehicle;
outputting positional relationship information of the first target and the second target;
converting the observation result of the first target and the observation result of the second target into a predetermined unified coordinate system according to a coordinate conversion parameter, performing time synchronization at a predetermined timing based on the speed, yaw rate, and steering angle of the own vehicle, and extracting first target information indicating a position of the first target and second target information indicating a position of the second target;
estimating an estimated position of the second target using the first target information, the second target information, and the positional relationship information;
calculating a deviation amount of the second sensor using the second target information and the estimated position of the second target and estimating a correction amount;
changing the coordinate conversion parameter based on the correction amount;
accumulating, using the position and an absolute speed of the first target in the unified coordinate system, the position of the first target that changes with time,
determining the accumulated position as a constant array pattern, and
recognizing the first target using the determined array pattern.

* * * * *